United States Patent
Park et al.

(12) United States Patent (10) Patent No.: US 7,602,567 B2
Park et al. (45) Date of Patent: Oct. 13, 2009

(54) FEED-FORWARD DC RESTORATION IN A PERPENDICULAR MAGNETIC READ CHANNEL

(75) Inventors: Jongseung Park, Fort Collins, CO (US); Andrei E. Vityaev, San Jose, CA (US); Alan D. Poeppelman, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 287 days.

(21) Appl. No.: 11/770,243

(22) Filed: Jun. 28, 2007

(65) Prior Publication Data
US 2009/0002862 A1 Jan. 1, 2009

(51) Int. Cl.
G11B 5/09 (2006.01)
(52) U.S. Cl. ........................................ 360/39
(58) Field of Classification Search .................. 360/39, 360/25, 51, 46, 67; 341/142
See application file for complete search history.

(56) References Cited

U.S. PATENT DOCUMENTS

| | | | |
|---|---|---|---|
| 6,785,074 B2 * | 8/2004 | Tsuchinaga | 360/39 |
| 7,116,504 B1 | 10/2006 | Oberg | 360/39 |
| 7,142,379 B2 * | 11/2006 | Tsuchinaga | 360/39 |
| 7,142,380 B2 * | 11/2006 | Ueno | 360/46 |
| 7,167,327 B2 * | 1/2007 | Feyh | 360/46 |
| 7,308,057 B1 | 12/2007 | Patapoutian | 375/350 |
| 7,330,320 B1 * | 2/2008 | Oberg et al. | 360/39 |
| 7,446,685 B1 * | 11/2008 | Kikugawa et al. | 341/142 |
| 2002/0034030 A1 | 3/2002 | Osafune | 360/32 |
| 2002/0089773 A1 * | 7/2002 | Shimomura et al. | 360/67 |
| 2004/0130816 A1 | 7/2004 | Feyh | 360/46 |
| 2006/0221476 A1 * | 10/2006 | Ueno | 360/25 |
| 2007/0121234 A1 * | 5/2007 | Abe | 360/51 |

OTHER PUBLICATIONS

"Read Channel for Perpendicular Magnetic Recording", Michael Madden et al., IEEE Transactions on Magnetics, vol. 40, No. 1, Jan. 2004, pp. 241-246.
"Baseline Wander Compensation for Perpendicular Recording". M. Faith Erden et al., IEEE Transactions on Magnetics, vol. 40, Jul. 2004, pp. 3114-3116.

* cited by examiner

*Primary Examiner*—Fred Tzeng
(74) *Attorney, Agent, or Firm*—Christopher P. Maiorana, PC

(57) ABSTRACT

A method of feed-forward DC restoration in a perpendicular magnetic read channel is disclosed. The method generally includes the steps of (A) generating a feed-forward signal by performing a first detection on an input signal, wherein a DC component of the input signal was previously filtered out in the perpendicular magnetic read channel, (B) generating a restored signal by summing the input signal and the feed-forward signal, the summing restoring the DC component previously filtered out and (C) generating an output signal by performing a second detection on the restored signal, wherein the first detection is independent of the second detection.

20 Claims, 4 Drawing Sheets

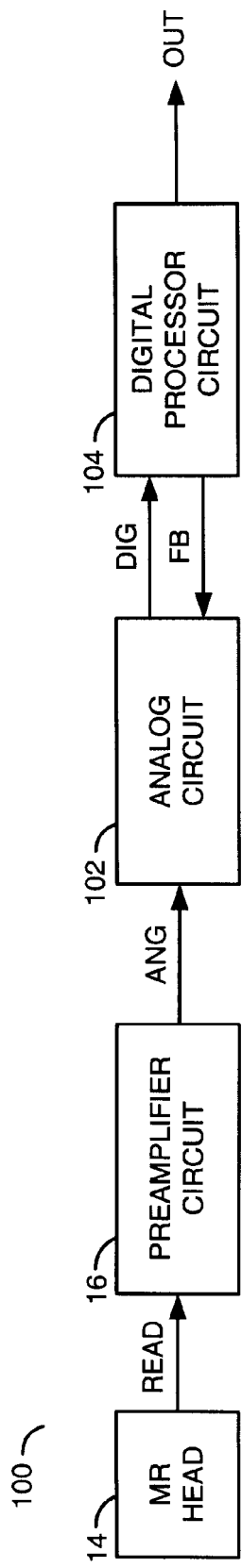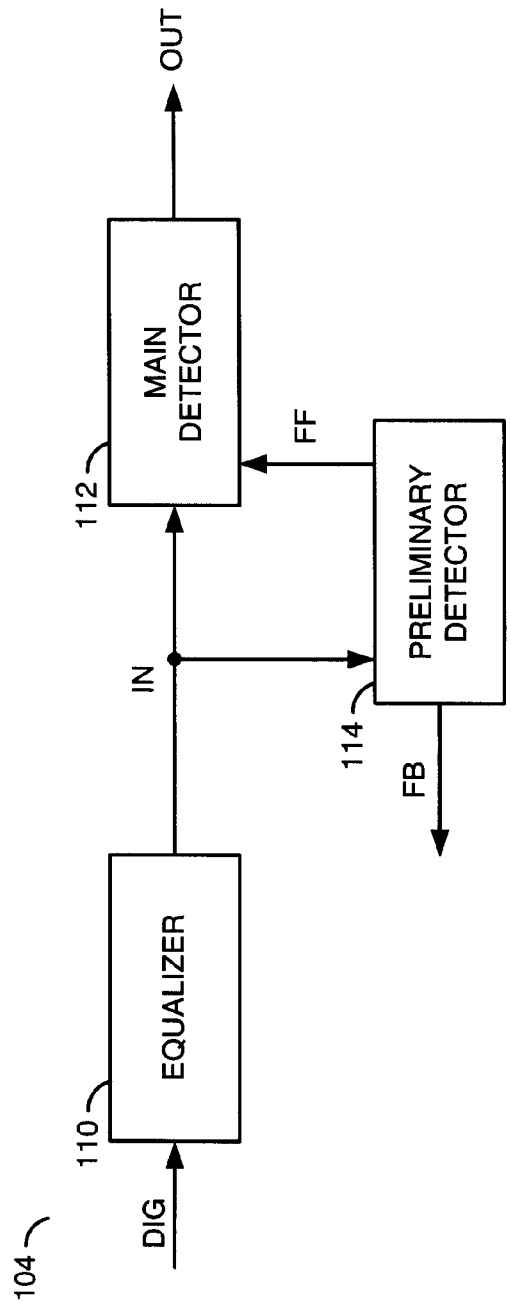

FEED-FORWARD DC RESTORATION IN A PERPENDICULAR MAGNETIC READ CHANNEL

FIELD OF THE INVENTION

The present invention relates to magnetic medium read channels generally and, more particularly, to feed-forward DC restoration in a perpendicular magnetic read channel.

BACKGROUND OF THE INVENTION

Referring to FIG. 1, a diagram of a front end in a conventional system 10 having a perpendicular magnetic medium 12 is shown. A read signal sensed from the perpendicular magnetic medium 12 has a large amount of power around a DC component. In a conventional read channel, a preamplifier circuit 16 in a magneto-resistive (MR) read head 14 and AC coupling in an analog-front-end circuit 18 block transmission of the DC components of the data read from the medium 12. The preamplifier 16 and the analog-front-end circuit 18 remove only a very narrow frequency band around DC of the transmitted signal to avoid a large signal-to-noise (SNR) loss. The resulting DC-free signal shows a sharp frequency response change around DC and is difficult to equalize to a predefined partial response target. To equalize the DC-free signal properly without incurring a significant SNR loss, both a long equalizer target and a long equalizer are commonly implemented. However, the common implementations result in complex and power hungry systems. Alternatively, refilling the lost DC signal (i.e., DC restoration) by feeding back hard decisions from a detector 20 can achieve a similar SNR gain.

Existing solutions to handle the DC restoration problem have a feedback loop that starts from the detector 20 and ends around an analog-to-digital converter (ADC) in the analog-front-end circuit 18. The feedback loop computes and restores the missing DC components before the detector 20.

The existing solutions have an intrinsic problem of having a long delay present inside the feedback loop. Due to an inability to move backward in time (i.e., an anti-causality problem), the feedback delay sets a limit to the SNR gain of existing feedback DC restoration schemes. Furthermore, the feedback delay in the feedback loop creates complex loop behavior that can cause loop instability.

SUMMARY OF THE INVENTION

The present invention concerns a method of feed-forward DC restoration in a perpendicular magnetic read channel. The method generally comprises the steps of (A) generating a feed-forward signal by performing a first detection on an input signal, wherein a DC component of the input signal was previously filtered out in the perpendicular magnetic read channel, (B) generating a restored signal by summing the input signal and the feed-forward signal, the summing restoring the DC component previously filtered out and (C) generating an output signal by performing a second detection on the restored signal, wherein the first detection is independent of the second detection.

The objects, features and advantages of the present invention include providing feed-forward DC restoration in a perpendicular magnetic read channel that may (i) achieve better error-rate performance than the conventional approach of using a finite impulse response equalizer by effectively providing an infinitely long impulse response and/or (ii) reduce stability problems associated with feedback loops.

BRIEF DESCRIPTION OF THE DRAWINGS

These and other objects, features and advantages of the present invention will be apparent from the following detailed description and the appended claims and drawings in which:

FIG. 2 is a block diagram of a system in accordance with a preferred embodiment of the present invention;

FIG. 3 is a detailed block diagram of an example implementation of a digital processor circuit;

DETAILED DESCRIPTION OF THE PREFERRED EMBODIMENTS

Figure 1:
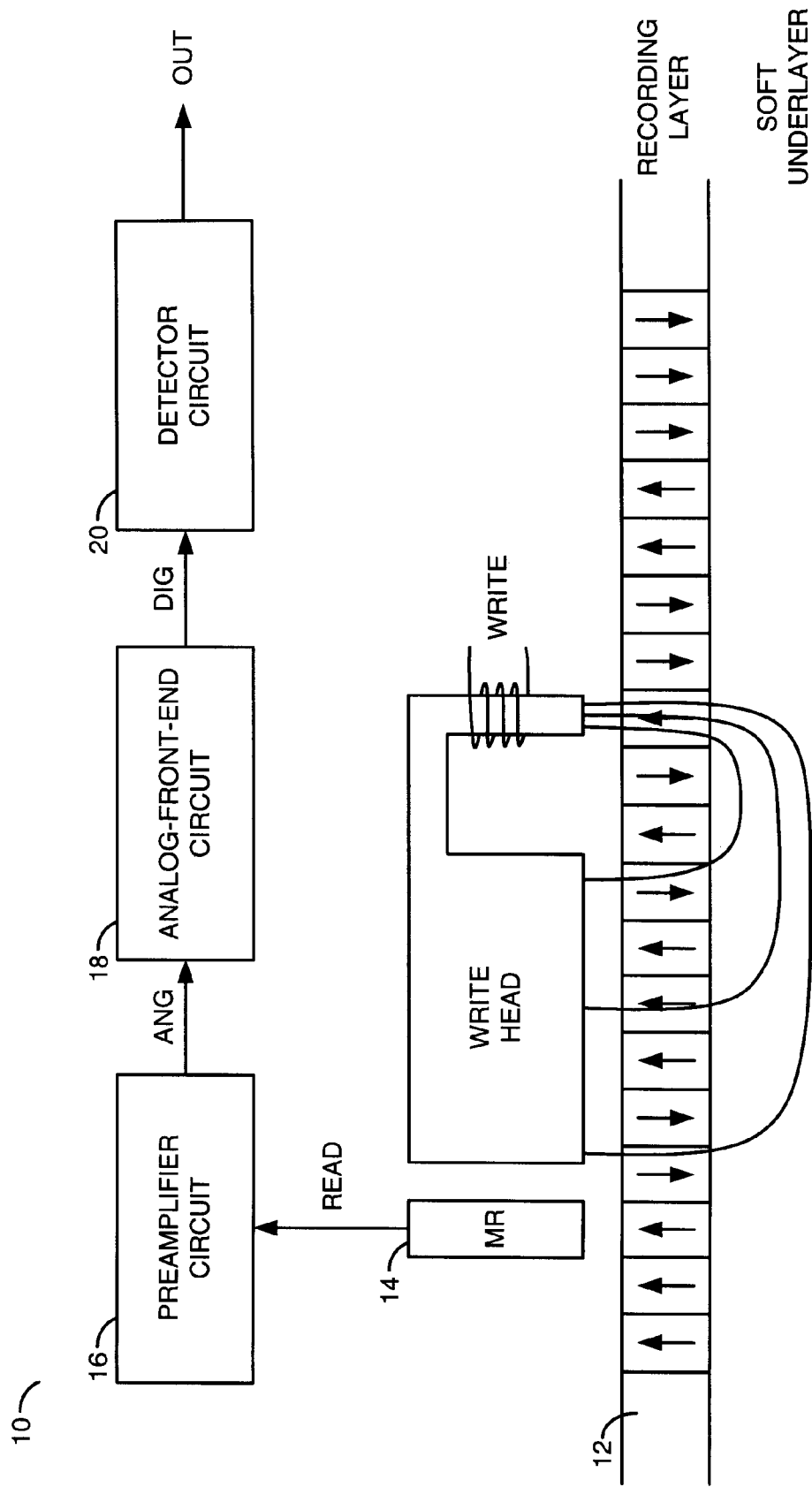
FIG. 1 is a diagram of a front end in a conventional system having a perpendicular magnetic medium system.

Referring to FIG. 2, a block diagram of a system 100 is shown in accordance with a preferred embodiment of the present invention. The system (or apparatus) 100 generally implements a read channel for a magnetic medium implementing a perpendicular recording scheme (e.g., medium 12). The system 100 generally comprises the read head 14, the preamplifier circuit 16, a circuit (or module) 102 and a circuit (or module) 104.

The read head 14 may generate a signal (e.g., READ) by sensing data read from a perpendicular recorded magnetic medium. An analog signal (e.g., ANG) may be generated by the circuit 16 and presented to the circuit 102. The circuit 102 may generate and present a digital signal (e.g., DIG) to the circuit 104. A feedback signal (e.g., FB) may be presented from the circuit 104 back to the circuit 102. The circuit 104 may generate an output signal (e.g., OUT).

The read head 14 may be implemented as a magneto-resistive read head. Other technologies may be used to implement the read head 14 to meet the criteria of a particular application. The signal READ generally includes large low-frequency components due to the perpendicular recording technique. Hereinafter, the low frequency components may be referred to as DC components.

The circuit 16 may be implemented as a preamplifier circuit mounted in (on) the head 14. The circuit 16 may be operational to amplify the signal READ to create the signal ANG. High pass filtering in the circuit 16 may attenuate the DC components in the signal ANG relative to the signal READ.

The circuit 102 generally implements an analog circuit. The circuit 102 may be operational to (i) adjust the signal ANG for asymmetrical characteristics of the head 14, (ii) low pass filter the signal ANG, (iii) digitize the signal ANG to create the signal DIG and (iv) perform a feedback DC restoration to the signal ANG based on the feedback signal FB. The signal DIG may convey a sequence of discrete symbols representative of the data sensed by the head 14 to the circuit 104. In some embodiments, the circuit 102 may be fabricated in (on) a chip independent of the head 14/circuit 16 assembly.

The circuit 104 may be implemented as a digital processor circuit. The circuit 104 may be operational to (i) generate the signal FB to the circuit 102 and (ii) convert (detect) the sequence of symbols received in the signal DIG to reproduce the data recorded in (on) the medium. The circuit 104 may be further operational to perform a feed-forward DC restoration loop to restore the DC components of the signal READ that may have been filtered out by the circuit 16 and/or the circuit 102. In some embodiments, the circuit 104 may be fabricated in (on) another chip independent of the circuit 102 and/or the head 14/circuit 16 assembly.

Referring to FIG. 3, a detailed block diagram of an example implementation of the circuit 104 is shown. The circuit 104 generally comprises a circuit (or module) 110, a circuit (or module) 112 and a circuit (or module) 114. The circuit may receive the signal DIG from the circuit 102. A signal (e.g., IN) may be generated by the circuit 110 and presented to both the circuit 112 and the circuit 114. The circuit 112 may generate the signal OUT. The circuit 114 may generate the signal FB and a feed-forward signal (e.g., FF) that is transferred to the circuit 112.

The circuit 110 may be implemented as an equalization circuit. The circuit 110 may be operational to frequency equalize the signal DIG to create the signal IN. In some embodiments, the equalization may be achieved by implementing a finite impulse response (FIR) filter. Other equalization techniques may be implemented to meet the criteria of a particular application.

The circuit 112 may be implemented as a detector circuit. The circuit 112 may be operational to (i) synchronize the data in the signal IN with the data in the signal FF, (ii) restore the previously filtered DC components back into the signal IN, (iii) equalize the restored signal and (iv) detect the most likely data sequence based on the DC restored symbols received in the signal IN to generate the signal OUT. As such, the circuit 112 may be referred to as a main detector circuit. In some embodiments, the circuit 112 may perform a Viterbi detection. Other detection techniques may be implemented to meet the criteria of a particular application.

The circuit 114 generally implements another detector circuit. The circuit 114 may be operational to (i) perform a preliminary detection of the data in the signal IN, (ii) filter a results of the detection to create the signal FF and (iii) filter the results of the detection to create the signal FB. As such, the circuit 114 may be referred to as a preliminary detector circuit.

The role of the circuit 114 generally includes making preliminary decisions on the bits received in the signal IN and driving an internal DC-restoration feed-forward filter. The signal FF generated by the DC-restoration filter may convey the missing DC components filtered from the signal READ. The circuit 112 may add the DC components to the signal IN. The combined signal may be processed by a main equalizer and then a main detector within the circuit 112. Therefore, the target of the main detector is generally a full DC target. A delay line function in the circuit 112 may be situated between the circuit 110 and the main equalizer to synchronize the signal IN with the signal FF. The entire DC-restoration scheme described above effectively adds the missing DC signal to the DC-free pre-equalized signal so that the main detector may ignore the presence of the high pass filters in the front end of the read channel.

Figure 4:
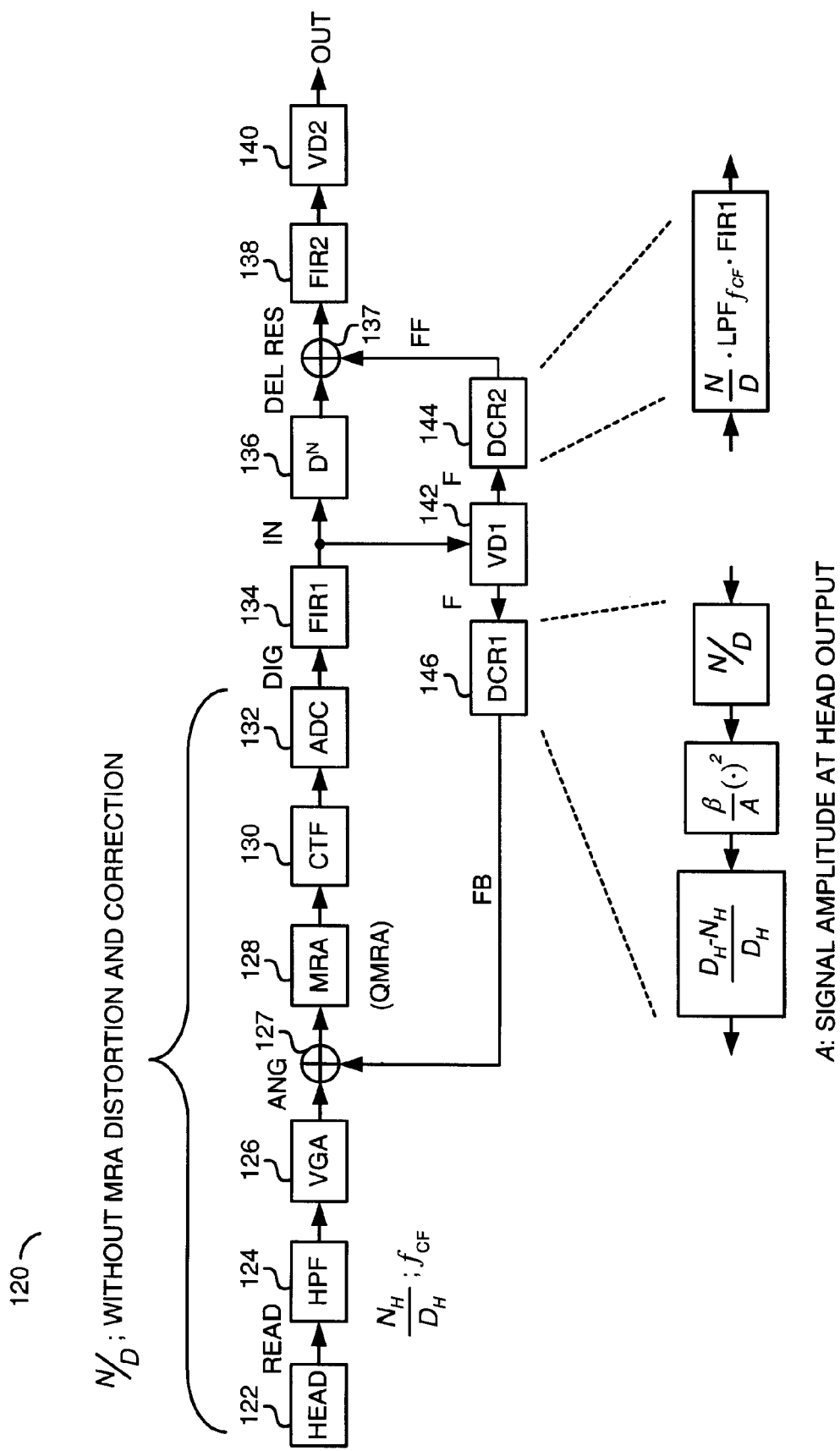
FIG. 4 is a functional block diagram of an example implementation of the system.
Figure 5:
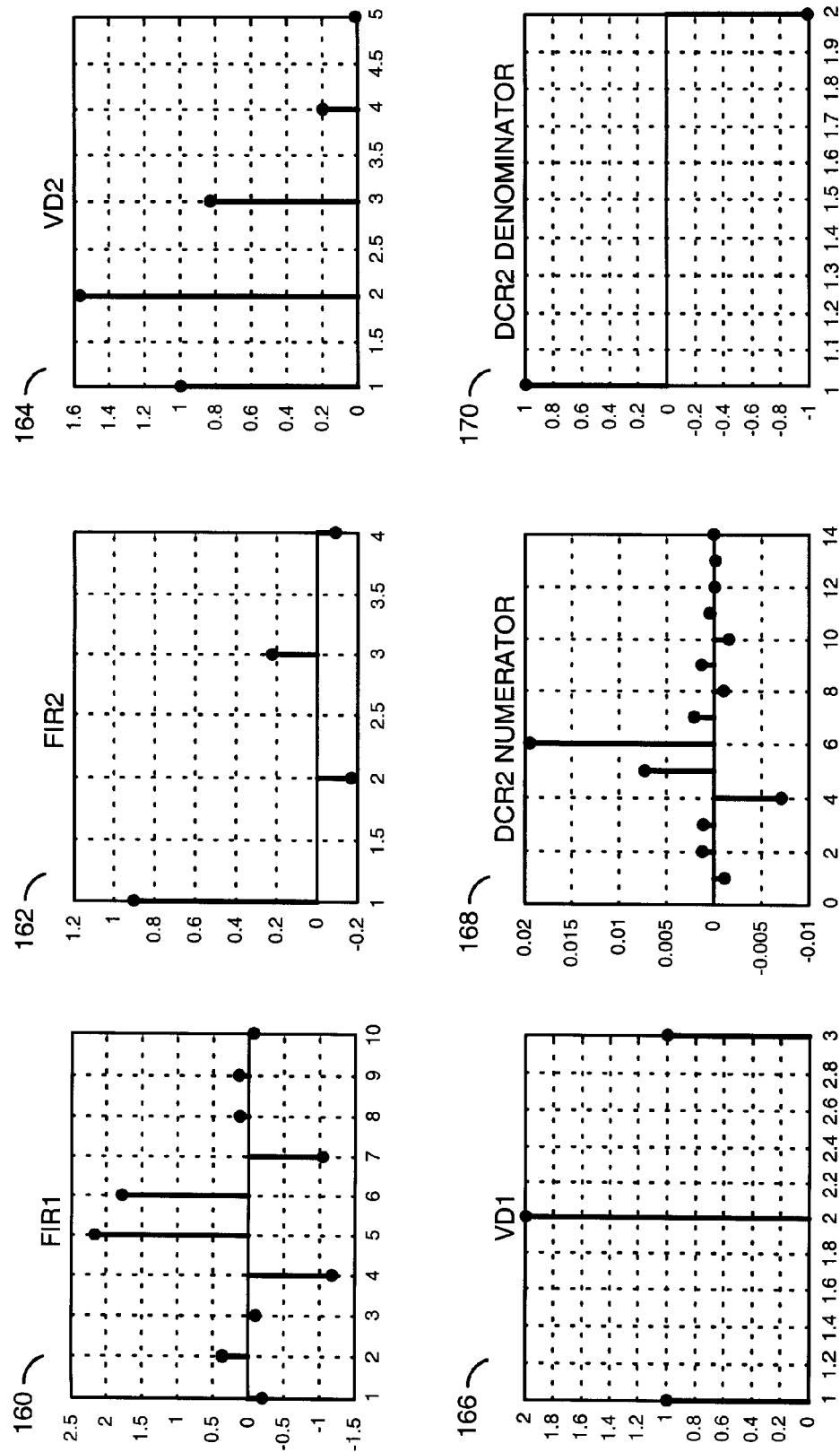
FIG. 5 illustrates several graphs of example filter parameters from a simulation of the system.

Referring to FIG. 4, a functional block diagram 120 of an example implementation of the system 100 is shown. FIG. 5, generally illustrates several graphs of example filter parameters from a simulation of the system 100. The system 100 generally comprises a block (or module) 122, a block (or module) 124, a block (or module) 126, a block (or module) 127, a block (or module) 128, a block (or module) 130, a block (or module) 132, a block (or module) 134, a block (or module) 136, a block (or module) 137, a block (or module) 138, a block (or module) 140, a block (or module) 142 and a block (or module) 144. As used below, a read channel signal may generically refer to the read data flowing through the system 100 from the block 122 to the signal OUT.

The block 122 may represent operations of the read head 14. The block 122 may create the initial electrical signal READ from the data sense from the perpendicular magnetic medium. The block 124 and the block 126 may represent operations of the circuit 16. High pass filtering (HPF) may be performed by the block 124. The high pass filtering may provide a high cut-off frequency among all previous high pass filters. A variable gain amplification (VGA) may be performed by the block 126. The signal ANG may be created by the block 126.

The blocks 127-132 generally represent the operations of the circuit 102. The block 127 may implement a summation module that adds the signal ANG and the signal FB at a start of a DC restoration feedback loop. The block 128 may be operational to provide compensation to a magneto-resistive asymmetry (MRA) characteristic of the head 14. In some embodiments, the block 128 may implement a quadratic MRA (QMRA) compensation. The block 130 is generally operational to implement a continuous time filter (CTF) capability. The CTF may provide waveform smoothing and phase equalization of the read channel signal. An analog-to-digital conversion (ADC) may be performed by the block 132. The block 132 may convert the read channel signal from an analog domain to a digital domain, as conveyed in the signal DIG.

The blocks 134-144 generally represent operations of the circuit 104. The block 134 may implement an equalization module that creates the signal IN by equalizing the signal DIG. The block 134 may be implemented as a finite impulse response (FIR) module. Other equalization techniques may be implemented to meet the criteria of a particular application. A set of example parameters for the block 134 are illustrated in graph 160 of FIG. 5.

The block 136 generally implements a delay module. The block 136 may be operational to delay the signal IN for a period of time. The period of time may match a delay through the blocks 142 and 144. Once delayed, the signal IN may be referred to as a delayed signal (e.g., DEL). The signal DEL may be transferred to the block 139.

The block 137 may implement another summation module. The block 137 may be operational to add the signal DEL to a feed-forward signal (e.g., FF) to create a restored signal (e.g., RES). The addition generally restores the DC components of the read channel signal filtered out by the blocks 124, 128, 130 and/or 134.

The block 138 may be implemented as a main equalization module. The block 138 generally operates to equalize the signal RES prior to a main detection operation. In some embodiments, the block 138 may be implemented as a finite impulse response filter. Other equalization techniques may be implemented to meet the criteria of a particular application. A set of example parameters for the block 138 is illustrated in graph 162 of FIG. 5.

The block 140 generally implements a main detection module. The block 140 may be operational to generate the signal OUT by detecting the DC-restored and equalized data received from the block 138. In some embodiments, the block 140 may be implemented as a Viterbi detector. Other detection designs may be implemented to meet the criteria of a particular application. A set of example parameters for the block 140 is illustrated in graph 164 of FIG. 5.

The block 142 may implement a preliminary detection module. The block 142 may be operational to generate a detected signal (e.g., F) by performing a preliminary detection of the signal IN. The signal F generally begins a feed-forward loop through the block 144 and the block 137 that restores the DC aspects of the read channel signal. The signal F may also begin a feedback loop through the block 146 to the block 127. A set of example parameters for the block 142 is illustrated in graph 166 of FIG. 5.

The main detection performed by the block 140 may differ from the preliminary detection performed by the block 142. The main detection may have a different target than the preliminary detection since the missing DC component may be restored and a SNR is generally improved for the block 140. Furthermore, the error rates of the main detection may be much lower than the error rates of the preliminary detection due to the restored DC components.

The block 144 may be implemented as a DC restoration (DCR) filter. The block 144 is generally operational as (i) a low pass filter and (ii) an amplifier to create the feed-forward signal FF from the detected signal F. In some embodiments, the amplification may have a scale factor of approximately 2. Other scale factors may be implemented as appropriate.

The block 144 may have an impulse response described as follows. Let an impulse response of the read channel before a dominant high-pass pole (e.g., usually a high-pass pole in the circuit 102) be h(z). Let the dominant high-pass filter generally be described as N(z)/D(z). Thus, an ideal impulse response of the block 144 may be h(z)*{(D(z)−N(z))/(D(z))}*Q(z), where * is the polynomial convolution and Q(z) is the equalizer. In some embodiments, the block 144 may be implemented as a simple low pass filter instead of (D(z)−N(z))/D(z) in the above expression with the same cutoff frequency as the dominant high-pass filter. A set of example parameters for the block 144 is illustrated in graphs 168 and 170 of FIG. 5.

The block 146 may be implemented as another DC restoration filter. The block 146 is generally operational to generate the feedback signal FF from the detected signal F. The signal F may form a starting point of the DC restoration feedback loop. The block 146 generally restores the missing DC components of the MRA distortion so that the MRA correction performed by the block 128 works correctly.

The feed-forward loop (e.g., blocks 142 and 144) and the delay block 136 generally solve an anti-causality problem intrinsic in existing solutions. Therefore, the system 100 may achieve an optimal error-rate performance. The optimal error-rate performance is generally defined as the error rate when (i) no high-pass filter is present in the read channel and (ii) the equalizer and the target are jointly optimized. Furthermore, since the DC-restoration is based on the feed-forward loop, the present invention is more robust with the stability problem commonly found in feedback-only techniques.

Depending on channel conditions, such as magneto-resistance asymmetry in the read head, simulation results for the system 100 generally show that the present invention may achieve error rates better than the optimal error-rates defined above. The good error rates are generally due to the DC-restoration scheme behaving as an equalization scheme having infinitely long impulse response.

The present invention may be applied to systems including a post-processor, with or without a parity code. In such cases, the preliminary detector (e.g., block 142) may be eliminated and the main detector (e.g., block 140) may drive the DC-restoration loop through the DC-restoration feed-forward filter. The restored DC signal may then be used in the branch metric computation inside the post-processor to improve error-rates.

The functions performed by the diagrams of FIGS. 2-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of feed-forward DC restoration in a perpendicular magnetic read channel, comprising the steps of:
   (A) generating a feed-forward signal by performing a first detection on a sequence of first symbols in an input signal, wherein (i) a DC component of said input signal was previously filtered out in said perpendicular magnetic read channel and (ii) said first symbols are representative of data read from a magnetic medium;
   (B) generating a sequence of second symbols in a restored signal by summing said input signal and said feed-forward signal, said summing restoring said DC component previously filtered out; and
   (C) generating a first most likely sequence of said data in an output signal by performing a second detection on said second symbols in said restored signal, wherein said first detection is independent of said second detection.

2. The method according to claim 1, wherein step (A) comprises the sub-step of:
   generating a second most likely sequence of said data in a first intermediate signal by performing said first detection on said input signal.

3. The method according to claim 2, wherein step (A) further comprises the sub-step of:
   generating said feed-forward signal by low pass filtering said second most likely sequence of said data.

4. The method according to claim 2, further comprising the step of:
   generating a second intermediate signal by performing said first detection on said input signal.

5. The method according to claim 4, further comprising the step of:
   generating a feedback signal by low pass filtering said second intermediate signal, wherein said feedback signal drives a DC restoration feedback operation in said perpendicular magnetic read channel.

6. The method according to claim 1, wherein step (C) comprises the sub-step of:
   delaying said input signal a length of time prior to said summing, said length of time synchronizing said first symbols in said input signal with corresponding information said feed-forward signal.

7. The method according to claim 6, wherein step (C) further comprises the sub-step:

generating an intermediate signal by equalizing said restored signal.

8. The method according to claim 7, wherein step (C) further comprises the sub-step of:
generating said output signal by performing said second detection on said intermediate signal.

9. The method according to claim 1, wherein (i) said first detection comprises a first Viterbi detection, (ii) said second detection comprises a second Viterbi detection and (iii) said second Viterbi detection achieves a better signal-to-noise ratio than said first Viterbi detection.

10. The method according to claim 1, further comprising the steps of:
generating a read signal by reading said data recorded perpendicularly in said magnetic medium;
high pass filtering said read signal thereby removing said DC component; and
generating said input signal by digitizing said read signal after said high pass filtering.

11. A circuit comprising:
a preliminary detection module configured to generate a feed-forward signal by performing a first detection on a sequence of first symbols in an input signal, wherein (i) a DC component of said input signal was previously filtered out in a perpendicular magnetic read channel and (ii) said first symbols are representative of data read from a magnetic medium; and
a main detection module configured to (i) generate a sequence of second symbols in a restored signal by summing said input signal and said feed-forward signal, said summing restoring said DC component previously filtered out and (ii) generate a first most likely sequence of said data in an output signal by performing a second detection on said second symbols in said restored signal, wherein said first detection is independent of said second detection.

12. The circuit according to claim 11, wherein said preliminary detection module comprises a detector configured to generate a second most likely sequence of said data in a first intermediate signal by performing said first detection on said input signal.

13. The circuit according to claim 12, wherein said preliminary detection module further comprises a first filter module configured to generate said feed-forward signal by low pass filtering said second most likely sequence of said data.

14. The circuit according to claim 12, wherein said detector is further configured to generate a second intermediate signal by performing said first detection on said input signal.

15. The circuit according to claim 14, wherein said preliminary detection module further comprises a second filter module configured to generate a feedback signal by low pass filtering said second intermediate signal, said feedback signal driving a DC restoration feedback operation in said perpendicular magnetic read channel.

16. The circuit according to claim 11, wherein said main detection module comprises a delay module configured to delay said input signal a length of time prior to said summing, said length of time synchronizing said first symbols in said input signal with corresponding information in said feed-forward signal.

17. The circuit according to claim 16, wherein said main detection module further comprises a summing module configured to generate said restored signal by summing said feed-forward signal with said input signal from said delay module.

18. The circuit according to claim 17, wherein said main detection module further comprises an equalization module configured to equalize said restored signal.

19. The circuit according to claim 18, wherein said main detection module further comprises a detector configured to generate said output signal by performing said second detection on said restored signal.

20. A circuit comprising:
means for generating a feed-forward signal by performing a first detection on a sequence of first symbols in an input signal, wherein (i) a DC component of said input signal was previously filtered out in a perpendicular magnetic read channel and (ii) said first symbols are representative of data read from a magnetic medium;
means for generating a sequence of second symbols in a restored signal by summing said input signal and said feed-forward signal, said summing restoring said DC component previously filtered out; and
means for generating a first most likely sequence of said data in an output signal by performing a second detection on said second symbols in said restored signal, wherein said first detection is independent of said second detection.

* * * * *